United States Patent [19]

Musschoot

[11] E Patent Number: Re. 33,542

[45] Reissued Date of Patent: Feb. 26, 1991

[54] TUMBLING APPARATUS

[75] Inventor: Albert Musschoot, Barrington, Ill.

[73] Assignee: General Kinematics Corporation, Barrington, Ill.

[21] Appl. No.: 516,711

[22] Filed: Apr. 17, 1990

Related U.S. Patent Documents

Reissue of:

[64] Patent No.: 4,709,507
Issued: Dec. 1, 1987
Appl. No.: 922,062
Filed: Oct. 22, 1986

U.S. Applications:

[63] Continuation of Ser. No. 777,821, Sep. 19, 1985, abandoned, which is a continuation-in-part of Ser. No. 685,121, Dec. 21, 1984, abandoned.

[51] Int. Cl.[5] ..... B24B 31/06
[52] U.S. Cl. ..... 51/7; 51/17
[58] Field of Search ..... 51/7, 17, 18, 6, 313, 51/163.1, 164.1, 422, 423

[56] References Cited

U.S. PATENT DOCUMENTS

| | | | |
|---|---|---|---|
| 2,887,826 | 5/1959 | Schultz | 51/423 |
| 3,053,379 | 9/1962 | Roder et al. | 198/220 |
| 3,157,004 | 11/1964 | Musschoot | 51/7 |
| 3,197,922 | 8/1965 | Smith | 51/163 |
| 3,336,701 | 8/1967 | Moore | 51/163.1 |
| 3,769,758 | 11/1973 | McDonald | 51/163 |
| 3,793,780 | 2/1974 | Musschoot | 51/422 |
| 3,978,623 | 9/1976 | Smith | 51/163.1 |
| 3,991,524 | 11/1976 | Ferrara | 51/163.1 |
| 4,025,419 | 5/1977 | Musschoot | 51/163.1 |
| 4,527,747 | 7/1985 | Scharmer et al. | 241/26 |

FOREIGN PATENT DOCUMENTS

| | | | |
|---|---|---|---|
| 2853344 | 4/1978 | Fed. Rep. of Germany . | |
| 2445735 | 9/1979 | France | 51/422 |

OTHER PUBLICATIONS

New Vibrating Drum: Two-Mass Sub-Resonant Natural Frequency Design, General Kinematics Corporation ©1986.

*Primary Examiner*—Robert A. Rose
*Attorney, Agent, or Firm*—Wood, Phillips, Mason, Recktenwald & VanSanten

[57] ABSTRACT

A vibratory material handling apparatus is provided for mixing of materials, cleaning, blending and/or shake-out of castings or the like. The machine comprises a horizontal container carried by a frame resiliently mounted on a foundation. A vibration generator is carried by the container and produces a line of force along an axis which passes exteriorly of the container. The vibration generator is adjustable on the container so that the direction of the line of vibratory force can be changed for changing the tumbling, mixing, cleaning, blending or shake-out characteristics of the machine. The relative movement between the inside of the container and the material in the container describes angles of attack with the container surface which movements are rotational about a center of rotation. A line from the center of rotation through the center or gravity of the container intersects the line of force from the vibration generator at a substantially right angle.

14 Claims, 6 Drawing Sheets

180
178
174
176
114
156
169
170
136
132
148
158
166
168
166
110
160
150
144
152
134
112
182
R
CG
139
140
142
183
186
118
116
124
124
126
126
130
130
128

180
172
114
176
169
170
156
136
132
158
166
168
100
134
154
146
CG
R
112
192
139
140
142
118
116
190
124
188
126
130
128
193
192

174
172
178
176
114
169
170
136
158
160
166
146
146
116
192
138
140
124
142
124
112
130
130

TUMBLING APPARATUS

Matter enclosed in heavy brackets [ ] appears in the original patent but forms no part of this reissue specification; matter printed in italics indicates the additions made by reissue.

CROSS-REFERENCE

This application is a continuation application of application Ser. No. 777,821 filed Sept. 19, 1985 now abandoned, which was a continuation-in-part of application Ser. No. 685,121 filed Dec. 21, 1984 how abandoned.

BACKGROUND OF THE INVENTION

1. Field of the Invention

This invention relates to tumbling apparatus and, in particular, to improved vibrating tumbling machines for mixing materials and for cleaning or shake-out of parts to be processed, such as castings, moldings or bulk material with or without a working media.

2. The Problem and the Prior Art

It was found sometime ago that an improved finish could be obtained on cast or molded parts by adding a vibratory motion to the tumbling apparatus. In the early 1960's, I developed and patented under U.S. Pat. No. 3,157,004, an improved burnishing apparatus using a U-shaped tub mounted on trunnions. Vibratory force was applied directly to the U-shaped tub and passed through the center of gravity of the tub. When the tub was tilted about the trunnions, the vibratory force was used to discharge the media and parts from the tub.

Although improved burnishing of the parts resulted from the above use of vibratory motion through the center of gravity of the tumbling apparatus, problems continued with the balance of the machine, with the wear on bearings, and with the time it took to obtain the finish.

THE INVENTION

The present invention is specifically directed to overcoming the above-enumerated problems in a novel and simple manner.

According to the invention, a vibrating tumbling apparatus comprises a container, which may be a cylindrical drum, and a frame which are resiliently mounted on a foundation. A bracket on the container supports a vibration generator capable of producing linear vibratory motion. The arrangement is such that the container is vibrated along small segments of an arcuate or circular path centered at a point offset from the center of the container. The tumbling apparatus will have a batch of material (which may be castings with or without media) in the container. The apparatus may also be used to mix materials of different characteristics in a highly efficient manner. The material in the container is moved or conveyed and tumbled not only due to the coefficient of friction of the material with the surface of the container, but also due to the angle of attack between the material and the surface of the container at any given point because of the segmental circular path. A line from the center of rotation through the center of gravity of the machine intersects the linear line of force generated by the vibration generator at an angle of 90°. The angle of attach between the material and the container can be varied to vary the rate or character of mixing, to vary the rate of cleaning, to vary the amount of tumbling, to vary the conveying and tumbling action between the material and the surface of the container and the like.

Preferred forms of the invention are shown in the accompanying drawings.

DETAILED DESCRIPTION OF THE DRAWINGS

Figure 1:
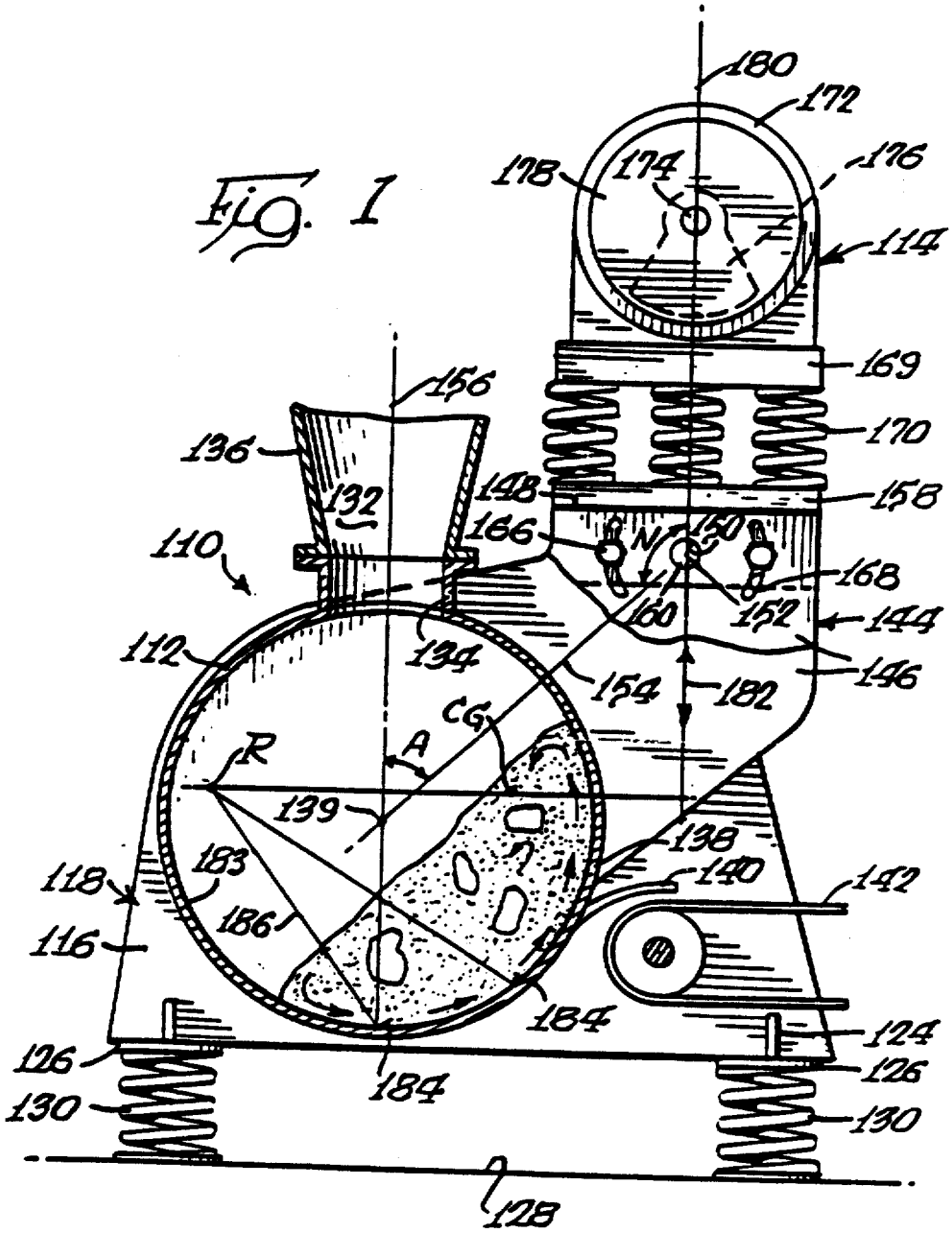
FIG. 1 is an end view of one preferred form of a vibratory tumbling machine with some parts shown in cross-section and some parts shown in phantom.
Figure 2:
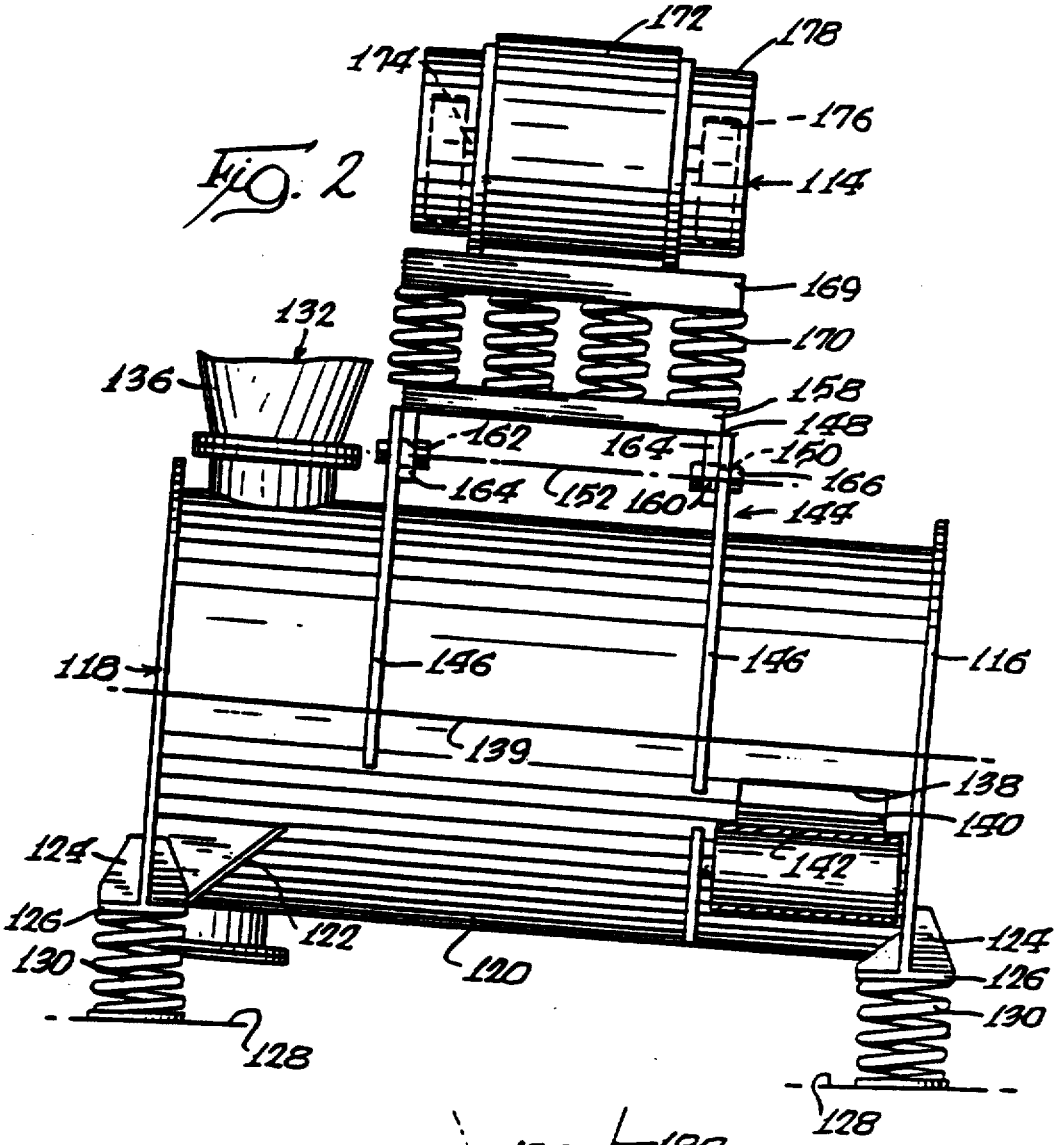
FIG. 2 is an elevation view of the machine of FIG. 1 as viewed from the right in FIG. 1.
Figure 3:
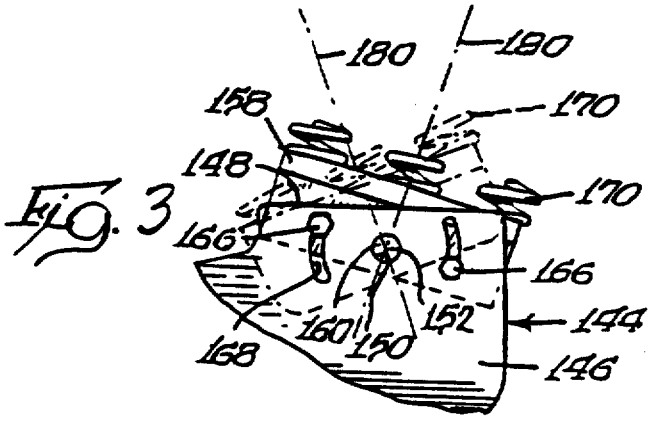
FIG. 3 is a view like FIG. 1 but with a difference in the line of application of the vibratory force.

In one preferred form of the invention shown in FIGS. 1–3, a tumbling apparatus for mixing, cleaning, and/or shake-out of parts is designated by the numeral 110 and comprises a container 112 which in the illustrated form is a cylindrical drum and a vibration generator 114. The container 112 could be an open top member, an oval member or any desired shaped member as long as it has a horizontal axis. The container 112 is attached at each end to end plate 116 of a frame 118. In addition to the end plates 116, the frame has a bottom plate 120 connected to the end plates with corner reinforcing gussets 122 extending between the container, an end plate and the bottom plate for supporting the container 112. Gussets 124 extend between a flange 126 and the end plates in the vicinity of the corners of the machine to provide reinforced pads at the corners. The machine is resiliently supported on a foundation or base 128 by means of springs 130 attached to the pads on the flanges 126 and to the foundation. The springs 130 may be coil springs, as shown, or may be air springs or the like.

The container 112 has an inlet port 132 near the high point of the container at one end portion and is comprised of a flanged opening 134 having a funnel shaped hopper 136. The inlet port 132 could be through the high part of the end plate 116 just as well. An outlet port 138 is formed through the side wall of the container upward of the low point of the container and at the opposite end of the container from the inlet port. The outlet port 138 can be opened or closed, but when opened, has a platform 140 over which the discharged parts and/or media flows. A conveyor 142 communicates with the outlet port for conveying discharged parts and/or media away from the machine. The discharge or outlet port 138 could be through the low point of the cylinder of the container for certain applications. It will be noted in FIG. 5 that the horizontal axis 139 of the container angles a few degrees from the horizontal so that the outlet end of the container is lower than the inlet end. This accommodates flow of the material through the container as the tumbling, mixing, polishing and/or shake-out is taking place.

A bracket 144 includes a pair of spaced apart mounting supports 146 and is affixed to the container on one side of the vertical axis of the container. The ends of the supports 146 spaced from the container have a substantially horizontal edge 148 with an aperture 150 through an end portion of each support in horizontal alignment with each other. A horizontal axis 152 connecting the centers of the two apertures 150 is parallel to the horizontal axis 139 of the container. As shown in FIG. 1, a line 154 drawn through the center (at the horizontal axis 139) of the container 112 and the center (horizontal axis 152) of the apertures 150 of the bracket 144 forms an angle A to the vertical axis 156 of the machine. As shown, the angle A between line 154 and vertical axis 156 of the container is approximately 45°. The bracket 144 also has a mounting deck 158 between the supports 146 and, as shown, the deck is pivotally mounted to the supports 146 by pivot pins 160 passing through apertures 162 in depending flanges 164 on the deck and through the apertures 150 in the supports 146. The deck 158 is locked in position relative to supports 146 by means of a pair of bolts 166 passing through arcuate slots 168 in the supports 146. When the bolts 166 are tightened down, the deck 158 is locked in place on the supports on the container. For the purposes of FIG. 1, the surface of the deck 158 lies in a plane perpendicular to the vertical axis 156 and parallel to the horizontal axis 152 of the pivot pins 160.

The vibration generator 114 comprises a support plate 169 resiliently mounted on the deck 158 of the bracket 144 by a plurality of springs 170. A motor 172 is mounted on the support plate 169 with the axis of the double ended drive shaft 174 lying substantially parallel to the longitudinal axis 139 of the container. Eccentric weights 176 are mounted on each end of the double ended shaft and are encased in covers 178. Variable force vibration generators such as the types shown in my U.S. Pat. Nos. 4,495,826 and 3,358,815 may be substituted for the eccentric weights 176 on each end of the shaft 174. As illustrated in FIGS. 1–3, the linear vibratory forces are generated by a two mass system, the motor 172, plate 169 and weights 176 being one mass, and the container 112, bracket 144 and frame 118 being the second mass. The vibration generator 114 as shown in FIG. 1 has an axis 180 which is vertical and intersects the axis 154 of the pivot pins 160 and is perpendicular to the support surface or foundation 128.

Operation of the vibration generator 114 will produce vibratory forces 182 (illustrated generally by the double ended arrow) along a linear path 180. As shown, the path 180 and the linear forces 182 pass exteriorly of the container 112. The path 180 may intersect the container, but it should not go through the center of gravity of the container.

When the apparatus shown in FIGS. 1 and 2 is operating and the vibration generator is producing linear vibratory forces along the axis 182, the container 112 will move in an arcuate path, basically segments of a circle, having a center of rotation offset from the center of the container and located at point R. The material within the container in contact with or close to the inside surface will be moved along an angle of attack with respect to the inside surface of the container. The angle of attach is arcuate, basically a segment of a circle centered at R.

The center of rotation R is a point or a small closed figure such as a small circle or ellipse which for all practical purposes may be considered to be a point. The point R will lie along a line passing through the center of gravity CG of the container and intersecting the linear line of force 182 at an angle of 90°. That intersection is on one side of the center of gravity CG and the point R will be on the other side of the center of gravity.

The center of rotation R should be offset from the center of the cylindrical container. If the container is not cylindrical but has a concave material supporting surface, the center of rotation R should be offset from the centers of circles osculating said concave surface.[1]

[1]Webster's New Collegiate Dictionary 1975 defines an osculating circle as "a circle whose center lies on the concave side of a curve on the normal to a given point of the curve and whose radius is equal to the radius of curvature at that point."

Figure 7:
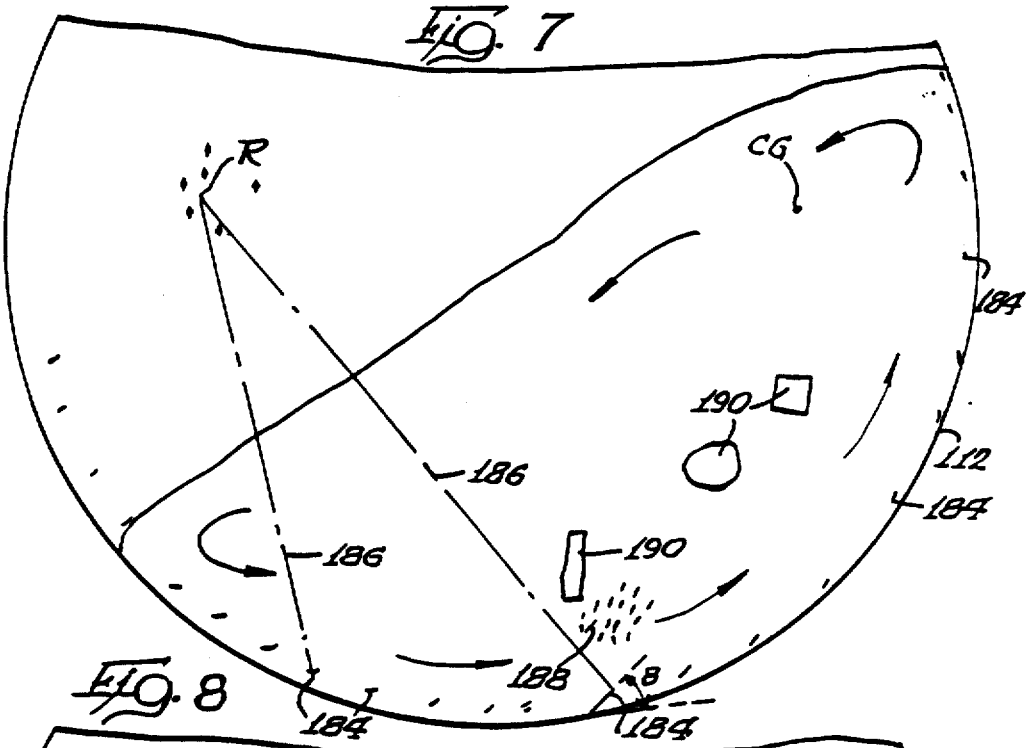
FIG. 7 is a copy of a chart of the paths of movement of material in the machine of FIG. 1 in operation.

To illustrate the concept, See FIG. 7, a sheet of paper was affixed to one end of the container 112 and the vibration generator 114 was energized and tuned to resonance, thereby producing a linear force 182 along the axis 180. A stylus carried by an immovably fixed support on the foundation or stationary surface 128 was engaged with the paper at various points on the end plate in alignment with the surface of the container. A tracing of the movement of the container, indicated at 184, was subscribed on the paper by the stylus. The stylus was spotted against the paper and container, a multiplicity of times in the vicinity of the center of rotation until the point R was located; that is, the point about which the container rotated. By drawing radii 186 from point R to the tracings, it was found that the tracing segments of a circle are centered at R.

The movements 184 along the bottom (or low point) of the container are directed inward into the mass with an angle of attack to produce conveying action of the media and parts. The movement 184 acting on the working media 188 and/or parts 190 in the container provide a vigorous and effective counterclockwise path of motion to the media and parts in the container. The parts and media are conveyed up the inner surface of the container adjacent the vibration generator before falling back into the container. The vigorous circulatory motion provides improved tumbling of the parts in the media to increase the speed and effectiveness of the mixing in the container and of the burnishing and polishing of the parts. Due to the slight tilt to the axis 139 of the container 112 to the horizontal, the parts, as they are tumbled, will migrate from the inlet end to the discharge end of the container. In the alternative, with the axis 139 of the container horizontal, the amount of material added at the inlet 136 will determine the amount of material discharged at the outlet port 138. The outlet port 138 can be open or closed (shown open in FIG. 1). When outlet port 138 is open, the media and parts will exit the container on the ramp 140 at the upper portion of the circulatory path. The ramp 140 can be foraminous to permit the media to fall down into a collection receptacle prior to being returned to the container or, as shown, the parts and media are delivered onto the conveyor 142 and will be conveyed to the next processing station. The inner surface of the container may be coated or lined 183 with a material having a particular coefficient of friction to aid in the conveying action and to improve the tumbling of the parts. The lining acts as a wear surface and can be replaced when worn.

The character of movement of the container and handling of the material within the container may be altered or modified by moving the location of the center of rotation R. The position of R will change if the direction of the linear vibratory forces change. Similarly, the position of R will change if the center of gravity CG is changed such as, for example, by adding weights to the container. Incidentally, when the center of gravity of the container is referred to, it includes not only the container 112 but all parts attached to the container between the springs 130 and the springs 170.

Figure 4:
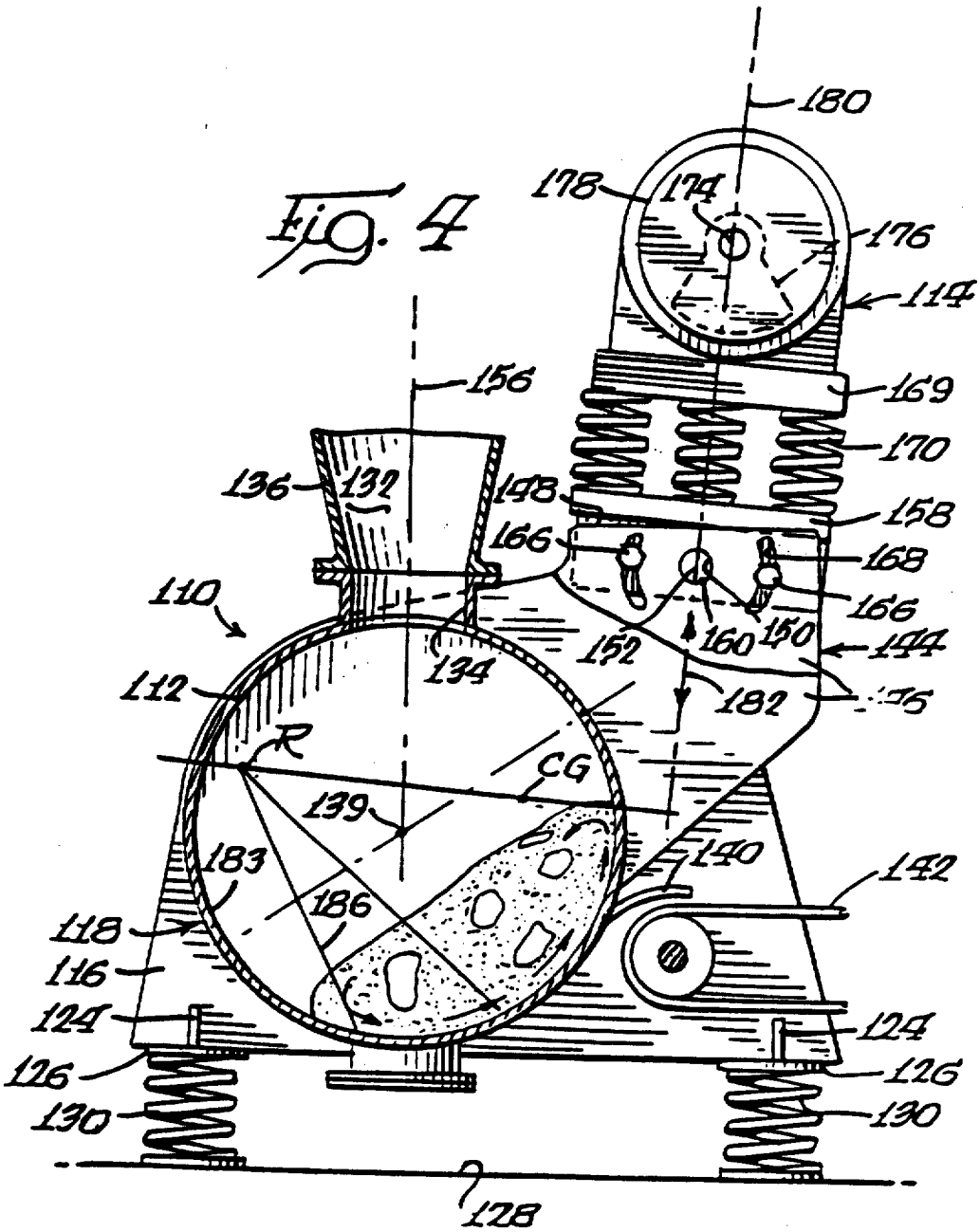
FIG. 4 is a view of one form of deck for mounting the vibration generator of FIG. 1 showing alternate positions of the deck.

The effects of changing the direction 182 of the vibratory forces is illustrated in FIG. 4. In this case the bolts 166 were loosened and the vibration generator 114 was tilted to incline the line of vibratory forces 182 some 5° from vertical and the line of vibratory forces angled toward the container. Inasmuch as the center of rotation R lies on a line normal to the line of force and passing through the center of gravity CG, R will assume a new position as shown in FIG. 4. With R in a new position, points on the inner surface of the container will move in a arcuate path or segments of a circle centered at the new location of R. This imparts a vibratory conveying movement to the material adjacent or in contact with such point to move along such paths thereby providing a different character of movement of the mass of material inside the container. The effect that will be first noted with the relocation of R is the change in the slope of the material within the container.

A valuable and perhaps surprising characteristic in the operation of the apparatus shown when used as a vibrating tumbling apparatus where parts and a media are placed within the container is that the parts themselves will remain immersed in the media. This is of importance not only in enhancing the cleaning and burnishing effect of the operation but also prevents damage to the parts being treated which would occur if the parts surfaced and vibrated directly against the interior surfaces of the container and against each other.

Figures 5, 9:
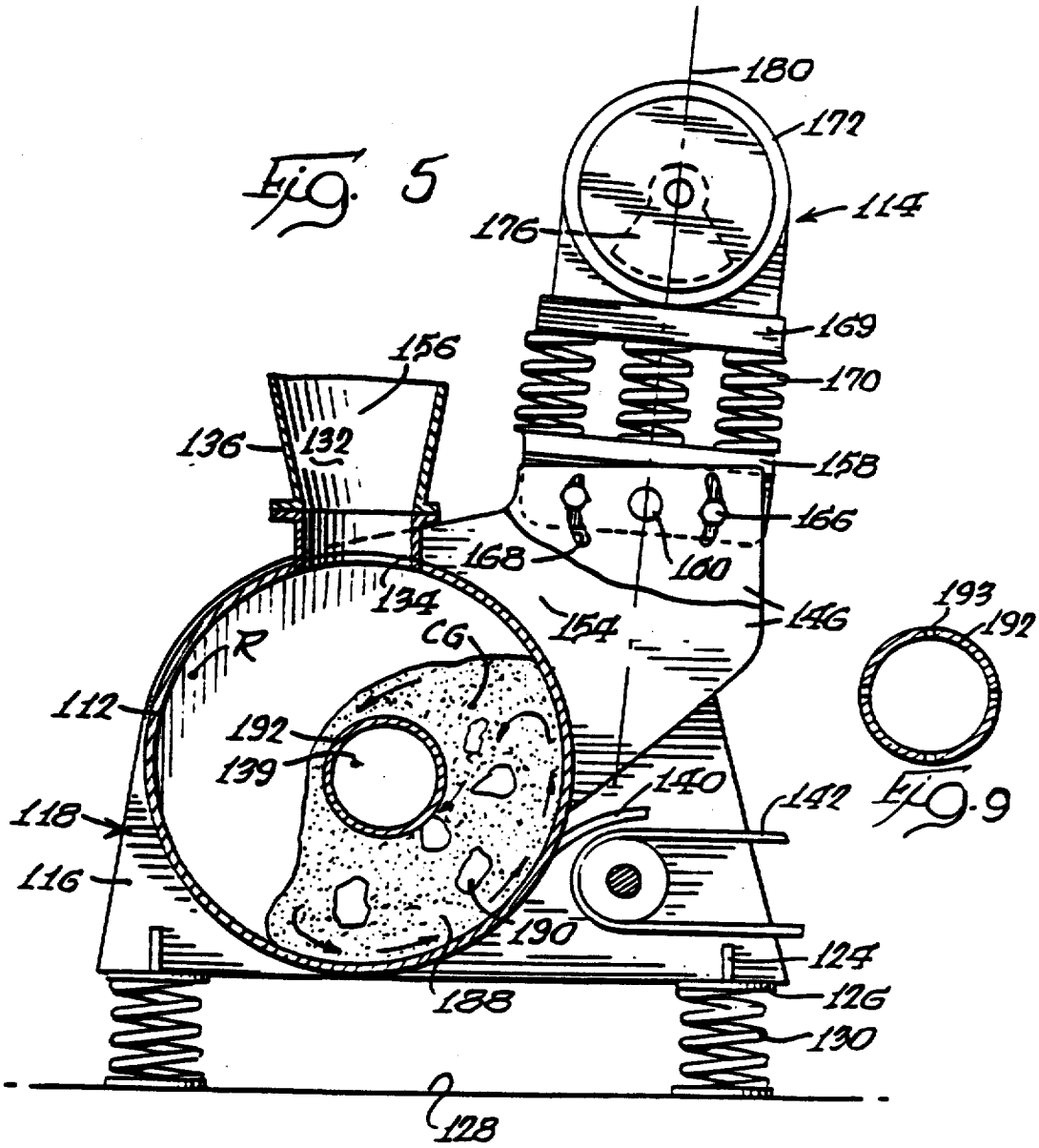
FIG. 5 is a view similar to FIG. 3 showing a modified form of the invention.
FIG. 9 is a cross-sectional view of a cylindrical deflector with openings or ports therethrough.
Figure 6:
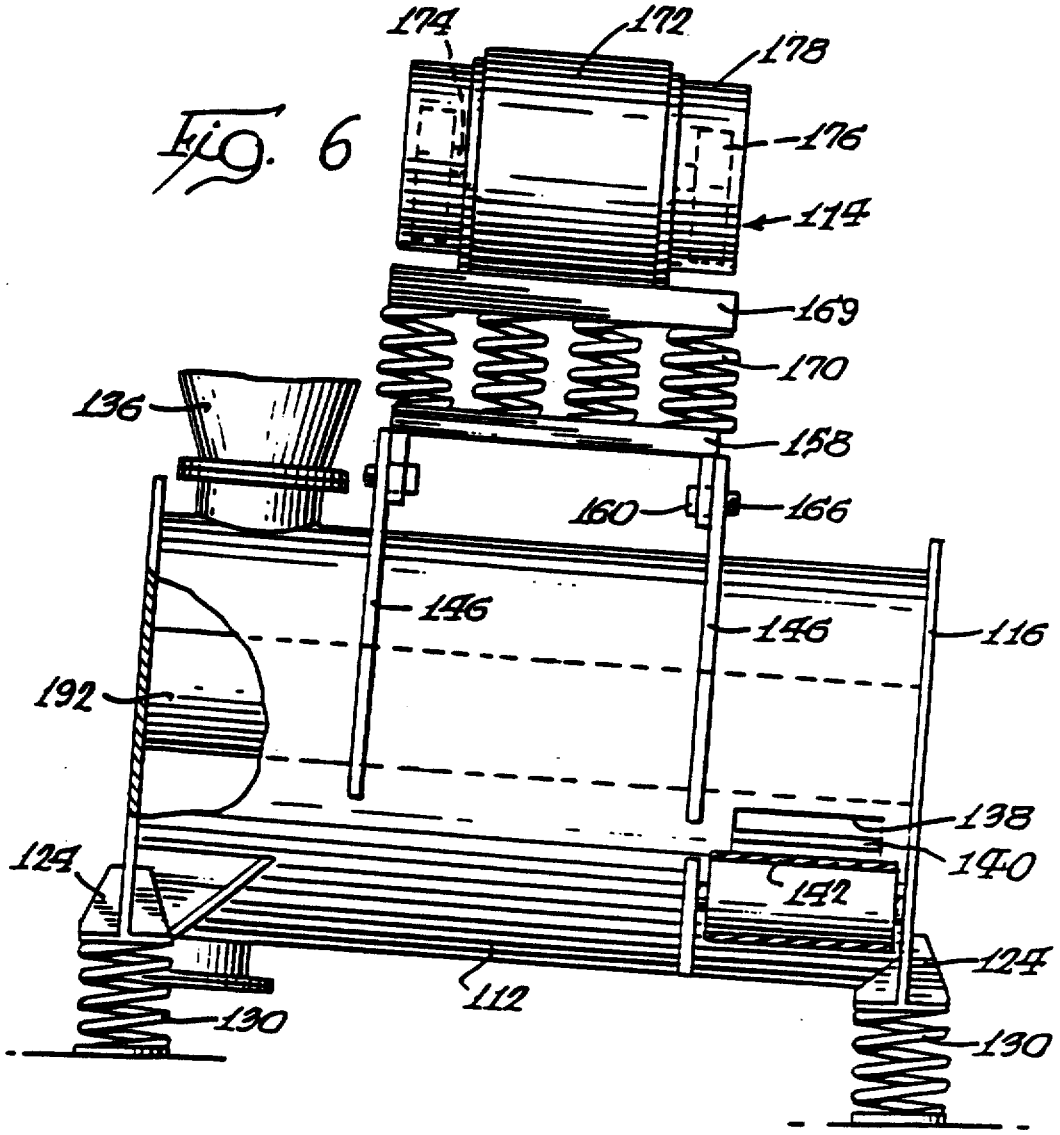
FIG. 6 is a view like FIG. 2 of the modified form of the invention.
Figure 8:
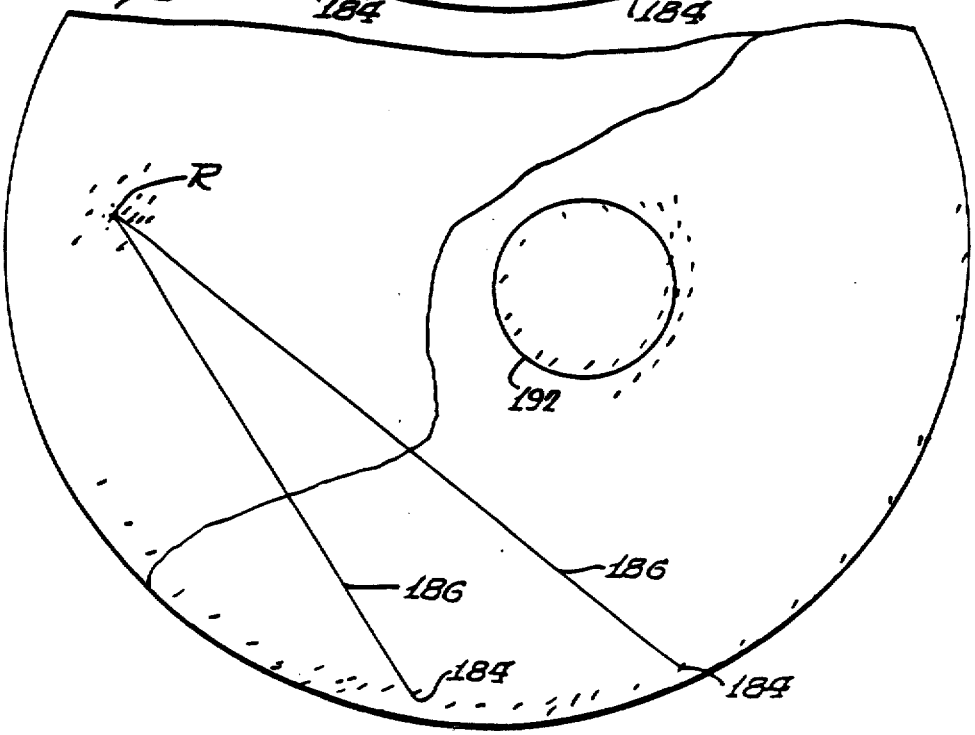
FIG. 8 is a copy of a chart of the paths of movement of material in the machine of FIG. 5 in operation.

FIGS. 5 and 6 show the machine 110 with the axis of the vibration generator 114 tilted to a 95° angle as in FIG. 4. A baffle or deflector 192 is selectively located in the container with FIG. 8 showing the flow pattern and forces acting on the material when the deflector 192 is added to the system. All of the structural elements of FIG. 5 that are the same as the structural elements of FIG. 1 will bear the same reference numerals. The line of vibrational force 182 is external of the container. The instantaneous center of rotation R will be located at point R so that the movement 184 acting on the material in the drum will subscribe the appropriate angle of attack with the surface of the container.

The baffle 192, which in FIGS. 5 and 6 is cylindrical but which could be square, rectangular, tear drop shape or the like in cross-section, extends from end to end of the container 112 between the end walls 116 and can be adjusted to any desired position using appropriate means. The baffle or deflector 192 deflects a portion of the media over the outside of the deflector changing the pattern of flow of media and parts 190 in the container. The baffle can be set so that only media goes over the deflector so that the parts remain submerged in the media. The tumbling and mixing of the media was more pronounced and the media and parts climbed higher in the container before the media cascaded back down over the deflector. With the deflector 192 adjusted so that it was closer to the container walls, the parts were sometimes exposed on the surface of the media but once the parts 190 tumbled over the deflector, they reimmersed in the media thereby minimizing scratching and bumping between the parts.

The deflector 192 may be provided with openings, or ports 193, see FIG. 9, through which hot air for heating the media or cold air for cooling the media can be piped. Burner jets could be provided in the deflector with the nozzles pointing into the media. When ignited, the jets would burn off carbonaceous particles on sand being processed and cleaned.

The line of force 182 along the axis 180 of the vibration generator passes exterior of the container or intersects the container, but does not pass through the center of gravity of the container.

Although I have described the improved tumbling apparatus as employing a two mass system, such as shown at 114 in FIG. 1, the apparatus does operate effectively with any linear vibratory force system mounted directly on the container and producing a linear line of force. The vibration generator 114 is shown upward and to the right of the container 112. It is to be understood that the vibration generator may be located at other positions as long as the line of force 182 is substantially offset from the center of gravity of the apparatus and so long as the center of rotation is not on the vertical centerline of the container 112. Thus, as all points on the material supporting surface of the container are moved in segments or paths of different circles having a common center at R, such segments or paths are not parallel.

I claim:

1. Vibratory apparatus comprising:

a generally horizontally arranged container defining an inside, curved material supporting surface and having a central axis;

mounting means for resiliently mounting the container relative to a mounting surface;

a vibration generator mounted on said container;

said container having a center of gravity and having unconstrained movement relative to the mounting surface; and means for directing the vibratory forces generated by the vibration generator along a linear path displaced from not only the central axis of the container but also from the center of gravity of the container, said linear path of vibratory forces passing on the side of the center of gravity removed from the central axis to cause points on the curved material supporting surface of the container to rotate along segments of circles.

each of said segments of said circles having a center located at a position displaced from the central axis and from said center of gravity on the other side of said central axis from said center of gravity so that the segments of the circles do not conform to the curvature of the curved material supporting surface.

2. Vibratory apparatus comprising:

a container having a central axis and a material supporting surface;

mounting means for resiliently mounting the container for unconstrained vibratory movement relative to a mounting surface;

vibration generator means [for generating ] *mounted on said container at a location offset on one side of the central axis of the container, said vibration generator means comprising shaft means disposed substantially parallel to the central axis, an eccentric*

*weight means carried by the shaft means, motor means for rotating the shaft means to generate* vibratory force *having a component* along a linear path offset from the central axis [and from a center of gravity] of the container on [the] *said one*side of the [center of gravity spaced from the] central axis *of the container,*

[said vibration generator means being mounted on the container] *said container and said vibration generator means having a center of gravity offset from said central axis of the container,* said vibratory forces vibrating each point on the material supporting surface along segments of circles, each segment having a center at a position *offset* from said central axis and from the center of gravity [on the side of the central axis spaced from the center of gravity] *and on the opposite side of the central axis of the container from said linear path of vibratory forces.*

3. Vibratory apparatus comprising:

a container having a central axis, a center of gravity displaced from said central axis, and a material supporting surface;

means for resiliently mounting the container for unconstrained vibratory movement relative to a mounting surface; and vibration generator means secured to the container for producing vibratory forces along a linear path extending on the side of the center of gravity of the container closest to said vibration generator means, said vibratory forces vibrating each point on the material supporting surface in paths lying on segments of circles having a center of rotation lying on a line normal to said linear path and passing through said center of gravity, said center of rotation being located on the other side of said central axis from said center of gravity.

4. Vibratory apparatus comprising:

a container having a material supporting surface and a central axis; said container being rigidly mounted on a frame, means for resiliently mounting said container and said frame for vibratory movement relative to a mounting surface; and vibration generator means secured to the container for producing vibratory forces directed along a linear path;

said container and frame having a center of gravity offset from the central axis of the container, said linear path of vibratory forces being offset from said center of gravity on the side of the center of gravity away from the central axis of the container, said vibratory forces vibrating each point on the material supporting surface along a path lying on a segment of a circle having a common center of rotation, said common center of rotation lying on a line normal to said linear path of passing through said center of gravity, said common center of rotation being located on the other side of said central axis from the center of gravity.

5. In a vibratory apparatus having a container rigidly mounted on a frame, means for resiliently mounting said container and said frame on a mounting surface with an axis of the container lying substantially horizontal, and vibration generating means for vibrating said container and frame comprising:

a vibration generator;

support means mounted on the container, said support means, said container and said frame having a center of gravity offset from said axis of the container on the same side of the axis of the container as the support means, resilient means for resiliently mounting the vibration generator on the support means, said vibration generator producing vibrational forces along a linear path passing on the side of the center of gravity of the container closest to said vibration generator, said vibrational forces generated by said vibrations generator producing rotational forces acting on the container to cause the container to rotate segmentally about a center of rotation, said center of rotation being located on the other side of said center of gravity from the vibration generator and being spaced from the container axis, the vibrational forces of the vibration generator producing rotational forces on the container which conveys material up the adjacent surface of the container until the material tumbles back into the container.

6. In the vibratory apparatus of claim 5 wherein said center of rotation lies on a line passing through said center of gravity of the apparatus and is perpendicular to the linear path of the vibratory forces generated by the vibration generator.

7. In the vibratory apparatus of claim 5 wherein said vibration generator is adjustably mounted on said container whereby the direction of the linear path of the vibrational forces of the vibration generator can be changed.

8. In a vibratory apparatus having a frame, resilient means mounting the frame on a mounting surface, a container having spaced ends with an inlet port at one end and an outlet port at the other end, the container being rigidly mounted on the frame with the axis of the container tilted from the inlet port toward the outlet port at an angle of a few degrees from the horizontal, said container and frame having a center of gravity offset from the axis of the container, and vibration generating structure comprising:

a linear vibration generator;

resilient means for resiliently mounting the vibration generator on the container;

said vibration generator producing vibrational forces along an axis of the vibration generator, the vibrational forces being offset from the axis of the container and being offset from the center of gravity on the side of the center of gravity away from the axis of the container;

said vibrational forces producing a center of rotation on the other side of the axis of the container from the center of gravity to produce rotational forces acting substantially perpendicular to radii drawn from the center of rotation to a point on the inside surface of the container, whereby media and parts being tumbled in the container will be moved up the inside surface of the container setting up a path of tumbling movement.

9. In the vibratory apparatus of claim 8 wherein means are provided for changing the angle of tilt of the container.

10. In the vibratory apparatus of claim 8 wherein means are provided for adjusting the vibratory generator relative to the container for changing the direction of the axis of the vibration generator which in turn changes the location of the center of rotation and changes the tumbling movement of the media and parts.

11. In the vibratory apparatus of claim 8 wherein the vibratory generator is a variable force vibratory generator for varying the vibratory forces acting on the contents of the container.

12. In the vibratory apparatus of claim 8 wherein deflector means is disposed in said container and is submerged in the media, said deflector means changing the path of tumbling movement.

13. In the vibratory apparatus of claim 12 wherein said deflector means lies parallel to the axis of the container and wherein air is passed through the deflector means and into the media and parts for modifying the condition of the media and parts.

14. Vibratory apparatus comprising:

a cylinder container having a material supporting surface and a substantially horizontally disposed central axis;

an inlet at one end portion of said container and an outlet at the other end portion of said container, a base, a plurality of isolation springs resiliently mounting the container on the base, a bracket rigidly mounted on the container; and vibration generator means carried by the bracket for producing vibratory forces directed along a linear path that passes exterior of the container;

said vibration generator means comprising (a) a support plate;

(b) vibratory force transmitting springs connecting said support plate to said bracket;

(c) a motor mounted on support plate;

(d) eccentric weights driven by said motor for producing said vibratory forces along said linear path;

said isolation springs permitting unconstrained vibratory movement of the container relative to said base;

said container and bracket having a center of gravity located on one side of the central axis of the container between the central axis of the container and the linear path of the vibratory forces;

said vibratory forces vibrating each point on the material supporting surface along a path lying on a segment of a circle having a common center of rotation, said common center of rotation lying on a line that passes through said center of gravity and is perpendicular to said linear path of vibratory forces produced by said vibration generator means, said common center of rotation being located on the opposite side of said central axis of the container from the center of gravity.

* * * * *

UNITED STATES PATENT AND TRADEMARK OFFICE

CERTIFICATE OF CORRECTION

PATENT NO. : RE. 33,542

DATED : February 26, 1991

INVENTOR(S) : Albert Musschoot

It is certified that error appears in the above-identified patent and that said Letters Patent is hereby corrected as shown below:

Column 7 (Claim 2), line 3, --force-- should be --forces--; line 5, --oneside-- should be two words --one side-- with --one-- shown in italics and --side-- in regular print;

Column 7, (Claim 2), line 14, the word --[spaced]-- should have appeared before --offset-- and should be enclosed in brackets.

Signed and Sealed this

Twenty-ninth Day of September, 1992

*Attest:*

DOUGLAS B. COMER

*Attesting Officer*

*Acting Commissioner of Patents and Trademarks*